Figure 1:
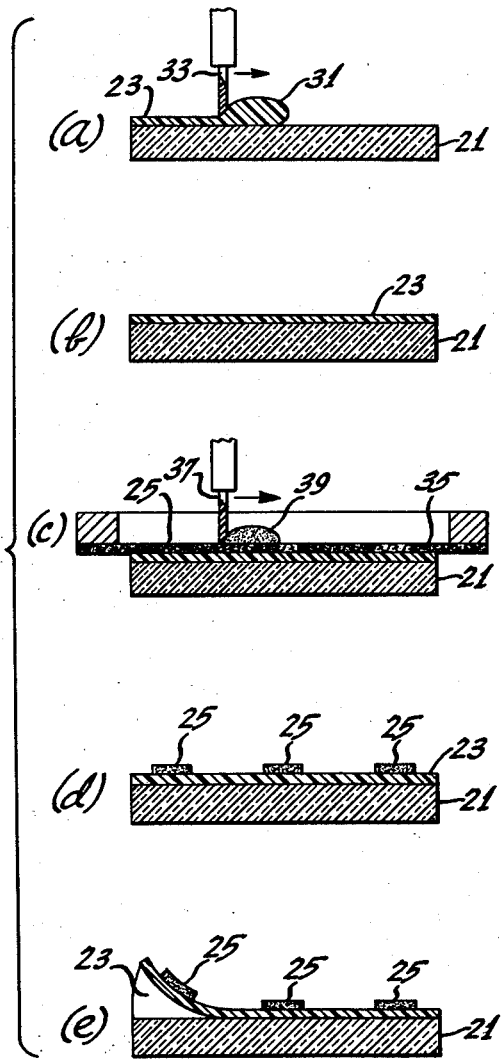

June 29, 1965  W. J. GYURK  3,192,086
METHODS FOR MANUFACTURING MULTILAYERED MONOLITHIC CERAMIC BODIES
Filed June 16, 1960  2 Sheets-Sheet 1

INVENTOR.
WARREN J. GYURK
BY
W.S. Hiep
AGENT

June 29, 1965 W. J. GYURK 3,192,086
METHODS FOR MANUFACTURING MULTILAYERED MONOLITHIC CERAMIC BODIES
Filed June 16, 1960 2 Sheets-Sheet 2

INVENTOR.
WARREN J. GYURK
BY
W.S. Hill
AGENT 3,192,086
METHODS FOR MANUFACTURING MULTI-LAYERED MONOLITHIC CERAMIC BODIES
Warren J. Gyurk, Somerville, N.J., assignor to Radio Corporation of America, a corporation of Delaware
Filed June 16, 1960, Ser. No. 36,670
8 Claims. (Cl. 156—89)

This invention relates to improved methods for manufacturing multilayer monolithic ceramic bodies particularly, but not necessarily exclusively, applicable to the manufacture of multilayer monolithic ceramic capacitors for use in micromodules for miniaturized electronic equipment.

Multilayer monolithic ceramic capacitors and methods of manufacturing them have been proposed previously. Such capacitors comprise alternate layers of metals and ceramic dielectrics, which layers have been sintered into a monolithic structure. Ideally, such capacitors are immune to humidity and other ambients and can be made in a wide variety of sizes, shapes, and electrical properties.

A previous method for preparing multilayer monolithic capacitors comprises building up the layered structure on a support, as by alternately spraying a layer of ceramic particles and a binder therefor, drying the sprayed layer, screening a layer of metal particles and a binder therefor upon the sprayed layer, drying the screened layer, and then repeating these operations until the desired number of layers have been produced. When a sufficient number of layers have been produced, the structure is stripped from its support and sintered at elevated temperatures. By another previous process, the step of spraying is replaced by producing the layer of ceramic particles by the technique of doctor blading.

In practicing these previous processes, a large number of units in the product are found to be defective. The reason for this is generally attributed to the fact that each successive layer, as it is formed by spraying, screening, or doctor blading, contains solvents which penetrate to the lower layers producing changes in size, configuration, and porosity.

To remedy this difficulty, it has been proposed to preform and sinter either the ceramic layers or the metal layers, to coat the sintered layers, to stack the coated layers in registry, and then to sinter the assemblage into a monolithic structure. Such a procedure requires additional processing time and equipment, and is limited in the shapes and thicknesses of the preforms that can be handled economically.

An object of this invention is to provide improved methods for manufacturing multilayer monolithic ceramic bodies.

A more specific object is to provide improved methods for manufacturing multilayer monolithic capacitors which overcome the disadvantages of previous methods while still retaining flexibility and reducing the amount of processing time and equipment.

In general, the methods of the invention comprise producing a plurality of individual dry thin films each comprising finely divided ceramic particles in a heat-volatile binder therefor. Optionally, a thin coating comprising finely divided metal particles in a heat-volatile binder therefor may be deposited on a predetermined surface area of one or more of said films. The films are then stacked upon one another and bonded into a laminate. Then, the said laminate is heated at a sintering temperature for said ceramic particles and cooled to room temperature.

In the preferred embodiment for manufacturing capacitors by the foregoing method, all but one of the films has a thin metal coating upon a plurality of predetermined surface areas thereof. After stacking the films with the coatings in registry above one another and the uncoated film on top, the stack is bonded into a laminate and the laminate is sintered. Individual units may be cut from the laminate either before or after sintering.

By producing a plurality of individual dry thin films of ceramic particles with or without a coating of metal particles in a binder therefor, the processes herein retain careful dimensional control of the films and of the coatings thereon. The problem of solvent penetration to lower layers is entirely eliminated without the need for fired preforms. By bonding a stack of the films in proper order and registry, the process herein avoids the difficulties resulting from the penetration of solvents and similarly avoids the additional time and equipment and the inflexibility of processes which use preforms. Nevertheless, the process herein provides wide flexibility in the selection of materials, geometries, and of the processing times by which the films and coatings are produced.

Figure 2:
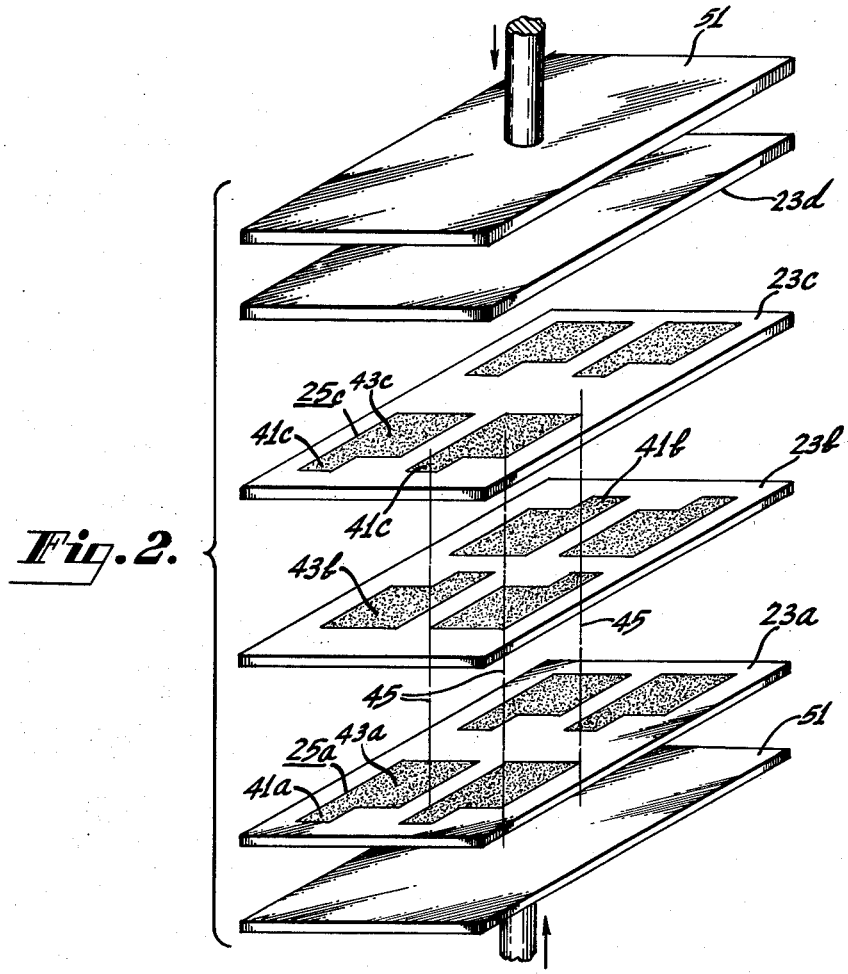
Figure 3:
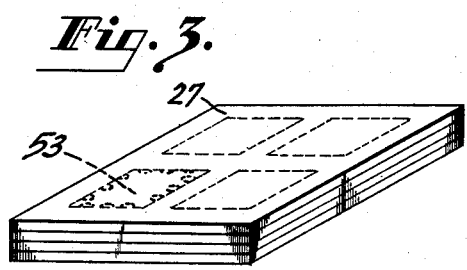
Figure 4:
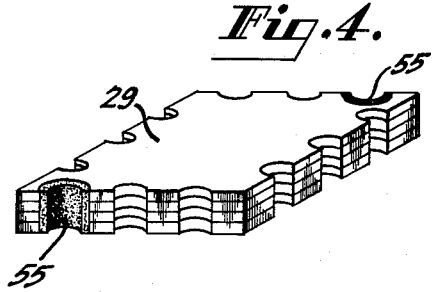

The invention is described in more detail in the following specification and in the drawings in which:

FIGURES 1(a) to 1(e) are sectional elevational views of structures illustrating the steps for producing coated films by one embodiment of the invention, FIGURE 2 is an exploded perspective view of structures illustrating the step of bonding a plurality of coated films in registry by one embodiment of the invention, FIGURE 3 is a perspective view of a laminate produced by bonding a plurality of coated films and indicates portions to be cut out of the laminate prior to sintering to produce individual units, and FIGURE 4 is a perspective view of a unit punched from the laminate of FIGURE 3 to which terminations have been applied.

Similar reference characters are used for similar structure throughout the drawings.

*Example 1.*—A preferred embodiment for practicing the method of the invention in preparing capacitors will now be given. A film formulation is prepared in the following weight proportions:

100 grams powdered ceramic dielectric composition having the molar ratio and composition: 1.0 mol barium carbonate and 5.0 mol titanium dioxide
15 grams heat-volatile binder, such as a vinyl chloride-acetate copolymer, for example Vinylite VYNS
85 grams solvent such as methyl ethyl ketone
1 gram butyl benzyl phthalate plasticizer for the binder, such as Santicizer 160
0.5 gram deflocculant for the ceramic dielectric powder The film formulation is agitated in a paint shaker for about 10 minutes. The viscosity is checked and adjusted to the desired value. The mixture is transferred to a suitable size ball mill and milled to acquire an average particle size of the solids of about 3.5 microns. A two pound batch in a 2 quart capacity ball mill requires about 12 hours of milling. When milling is completed, the milled batch is adjusted to have a specific gravity of about 2.3 and a viscosity of about 1000 centipoises.

A film 23 is now produced upon a suitable support 21 as illustrated in FIGURE 1(a). The support is plate glass which has a clean, smooth, impervious surface. A quantity 31 of the milled film formulation is poured on the support 21. A doctor blade 33, which is of tool steel, is passed across the surface of the plate 21. With ordinary hand pressure, the doctor blade 33 leaves a film 23 of the milled formulation on the support 21, which film 23 is about 1 mil thick. The excess milled film formulation 31 is removed and the film 23 is dried in air. The drying may be facilitated by the application of heat and the circulation of air over the film 23. It has been found convenient to dry the film 23 in a 100° C. oven for about 10 minutes. The resulting dry film 23, as shown in FIGURE 1(b), is flexible and strippable, and is to be removed from the support 21 in a later operation.

Next, a metallizing formulation is screened in a pattern of coated areas 25 upon the upper surface of the film 23 as shown in FIGURE 1(c). A quantity of Du Pont palladium paste No. 7665 (a powdered palladium composition consisting of about 42 percent by weight finely divided palladium suspended in an organic heat-volatile binder, and a solvent for the binder) is placed on a 100 mesh silk screen 35, which is filled except in the pattern of the desired areas. The screen 35 is placed in the desired position on the film 23 and a squeegee 37, which is of a stiff rubber, is passed across the surface of the screen 35, squeezing a portion of the metallizing formulation into the unfilled portion of the screen 35. The screen 35 is now removed leaving behind coated areas 25 on the film 23 as shown in FIGURE 1(d). The coated areas 25 are dried in air, preferably in a 100° C. oven for about 10 minutes. The dried coated areas or coatings 25 are about 0.5 mil thick.

Following the drying operation, the coated film 23 is stripped from its support 21 as shown in FIGURE 1(e). At this point the film is extremely flexible and may be cut easily to any desired size and shape. In the preferred embodiment, each coated area 25 includes a tab portion 41 which is not symmetrical with respect to the principal part 43a, 43b, 43c of the coated area 25 as shown in FIGURE 2 by the tabs 41a, 41b and 41c. These tabs are preferably produced on one side of the symmetry of the principal parts 43a, 43b, and 43c of the areas 25a, 25b and 25c. In preparing capacitors, the principal parts 43a, 43b, 43c become the electrode areas and the tabs 41a, 41b, 41c become part of the termination.

Three films 23a, 23b, and 23c are now stacked upon one another and oriented so that the principal parts 43a, 43b, and 43c of the areas 25a, 25b and 25c of successive films 23a, 23b, and 23c are in registry above one another as shown in exploded view in FIGURE 2 by guide lines 45. The tab portions 41a, 41b, and 41c of the successive layers are alternated to be on opposite sides and to extend beyond the principal parts 43a, 43b and 43c, which are in registry. A fourth film 23d having no coated areas thereon is positioned upon the coated surface of the third film 23c. The four films 23a, 23b, 23c, and 23d are thereby stacked upon one another with the coated areas in registry.

The stack of films is placed between platens 51 of a press (not shown). The platens are heated previously to about 125° C. The platens 51 now press the stack together with a pressure of about 1000 pounds per square inch for about 5 minutes. During the pressing step, the films in the stack are bonded together by the action of the heat and pressure to form a monolithic laminate 27. The pressure is removed, the platens 51 moved apart, and the laminate 27 removed.

FIGURE 3 illustrates the laminate 27 as it appears on removal from the press. Individual units may be stamped or cut from the laminate by any convenient process after bonding and either before or after sintering. In FIGURE 3, there is indicated by dotted lines 53 the portions from which units may be cut from the laminate 27, so that the principal areas 43a, 43b and 43c of the coating 25 are entirely within the unit, and so that the tabs 41a, 41b, and 41c extend beyond the unit.

In this example, the uncut laminate 27 is placed on a refractory setter, such as a zirconia setter, the setter placed in a furnace at 200° C. for about 30 minutes after which the temperature is increased at the rate of 50° C. each 15 minutes up to 400° C. and held there until the volatile matter has been removed from the laminate, typically 15 minutes. Then, the temperature is raised rapidly to about 1250° C. and held there for about two hours. During this period, the constituents of the ceramic dielectric composition react to form particles of ceramic dielectric: $BaO \cdot 5TiO_2$. Also the particles of metal and ceramic dielectric sinter into a unitary multilayer monolithic body. The furnace is cooled to room temperature and the monolithic body removed from the furnace.

In this example, units are now cut from the monolithic body as with a diamond saw. FIGURE 4 illustrates a unit 27 cut from the laminate with terminations 55 applied to connect the tab portions of the alternate metallized layers which are exposed in the cutting operation. The terminations 55 consist of a metal paste applied to the surface of the unit 29. The metal paste may be one of the pastes mentioned above, or a paste of about 65 percent by weight silver particles mixed with low-melting glass particles, and suspended in an organic heat-volatile binder and a solvent for the binder, such as the commercially available silver paste No. 4731 marketed by E. I. Du Pont de Nemours.

*The film.*—An essential part of the film formulation is the ceramic dielectric composition. By ceramic dielectric composition is meant (1) combinations of substances which upon heating react to produce ceramic dielectric particles, and also (2) substances which have already been reacted to produce ceramic dielectric particles. Any ceramic dielectric composition in particulate form may be used. Some typical ceramic dielectric compositions which may be used in the processes herein and their respective sintering temperatures and times in the processes herein are:

(A) 1 mol $BaCO_3$
    5 mols $TiO_2$
    Sinter at about 1250° C. for about 2 hours (B) 1 mol $La_2O_3$
    2 mols $TiO_2$
    Sinter at about 1500° C. for about 2 hours (C) $La_2Ti_2O_7$ (reacted)
    Sinter at about 1500° C. for about 2 hours (D) $BaTiO_3$ (reacted)
    Sinter at about 1350° C. for about 2 hours (E) $BaTiO_3$, 76.0 mol percent
    $CaTiO_3$, 6.0 mol percent
    $SrTiO_3$, 10.3 mol percent
    $CaZrO_3$, 5.8 mol percent
    $MgZrO_3$, 1.4 mol percent
    $CeO_2$, 0.5 mol percent
    Sinter at about 1370° C. for about 2 hours (F) $Al_2O_3$, 92 mol percent
    Talc, 6 mol percent
    $SiO_2$, 2 mol percent
    Sinter at about 1600° C. for about 2 hours Another essential part of the film formulation is the binder. The binder should be the type which upon heating completely volatilizes. The volatilization may be by evaporation, depolymerization, or oxidation. Further the volatilization should not be so rapid as to bloat or explode the laminate during the sintering step. The binder in the film should be compatible with the binder in the metallizing formulation and both should be of the type which bond together during the laminating step.

It is preferred to use thermoplastic synthetic organic film-forming materials as the binder. Some suitable binders of this type are polyvinyl chloride polymers, polyvinyl chloride-acetate copolymers, cellulose acetate polymers, nitro-cellulose, polyester polymers, and cellulose acetate-butyrate polymers.

The film may be produced by extrusion, in which case a solvent is not required. Where some other film-forming process is used, a solvent which is compatible with the binder may be required. Some solvents which may be used with the polyvinyl binders are methyl ethyl ketone, toluene, and alcohol.

The use of a plasticizer for the binder and a deflocculant for assisting in dispersing the ceramic dielectric composition and for adjusting the viscosity of the film formulation are optional. Where they are used, they are used in the combinations and in the quantities in which they are usually used in such systems.

The weight ratio of ceramic dielectric composition to binder in the film formulation may vary between 90/10 to 65/35. Preferably the ratio is between 88/12 and 82/18. In general, the lowest proportion of binder should be used consistent with adequate bonding during the lamination step. It has been found that formulations with finer particle sizes require a higher proportion of binder.

The film formulation may be mixed by any of the named methods, such as ballmilling, or by high speed agitation in an agitator or a homogenizer. In general, any method which produces a uniform dispersion is adequate. During the mixing step, the viscosity of the film formulation is adjusted by any of the usual methods which is compatible with the film forming step. Where the film 23 is to be produced by doctor blading, the film formulation preferably has a viscosity between 500 and 1500 centipoises and a specific gravity between 1.5 and 2.8.

The film is preferably formed physically by doctor blading as illustrated in FIGURE 1 (a). This process requires a minimum of equipment and still provides accurate control over the size and thickness of the film. Other methods for forming or casting the film may be used, such as by spraying the film formulation on a support, or screening on a support, or offset printing on a support, or by floating a low viscosity film formulation on an incompatible liquid. Where the film formulation is very viscous, the film may be produced by extrusion through a die onto a support. The support may be of any non-reactive material, such as plate glass or polished steel.

Where the film is formed on a solid support, it is frequently desirable to provide a parting agent between the film 23 and the support 21. A parting agent is an intermediate layer which exhibits low adherence for either or both the film 23 or the support 21 and is known in the art. It has been found experimentally that films having a vinyl chloride binder therein do not require a parting agent when doctor bladed upon a glass support, as in the example. Thus, the use of a parting agent depends upon the physical properties of the film formulation and of the support that is used.

The thickness of the film 23 as formed may be varied between about 0.5 and 20 mils. Upon drying and firing, the thickness is reduced by shrinkage by an amount which depends upon the particular film formulation. The film formulation of the example shrinks about 20% during drying and firing. Taking this as an average, the fired films will range in thickness between 0.4 and 16 mils thick.

Following the forming of the film 23, the film is dried. The film 23 may be dried by evaporation of the solvent in air. This may be accelerated by applying heat and/or air circulation. Where the film is produced by extrusion, the film is merely cooled on a support. Following drying and cooling, the film is ready for coating with a metallizing composition.

*The metallizing coating.*—The metallizing formulation may be any commercially available metallizing formulation, for example, palladium paste Nos. 6587 and 7665 (a powdered palladium composition consisting of about 42 percent by weight finely divided palladium suspended in an organic heat-volatile binder, and a solvent for the binder) and platinum paste No. 7698 (a powdered platinum composition consisting of about 42 percent by weight finely divided platinum suspended in an organic heat-volatile binder, and a solvent for the binder) all marketed by E. I. du Pont de Nemours and Co., Perth Amboy, N.J. These particular pastes consist essentially of metal particles in a heat-volatile binder, contain a solvent for the binder, and are free of fluxes. Generally, the metallizing formulation consists essentially of metal particles in a heat-volatile binder. By metals is meant particles of free metal and compounds of metal which decompose to free metal upon heating. The properties of the binder in the metallizing formulation should be similar to the properties of the binder in the film formulation. Further, the metallizing formulation should have a maturing temperature compatible with the sintering temperature of the ceramic dielectric composition. Thus, where it is compatible, the metallizing formulation may be of other metals or heat-decomposable metal compounds with or without a flux.

The metallizing formulation is applied as a coating to the film wherever an electrical or heat conducting region is desired. In many cases, no conducting region is desired and the coating is omitted completely. Where a conducting region is desired, the metallizing formulation is applied in the desired configuration by any of the known printing or stencilling techniques. Thus, a stencil may be pressed against a surface of the film and the coating composition sprayed or brushed into the uncovered portions of the film 23. Or, the coating pattern may be produced by offset printing upon the film 23. Preferably, the pattern and coating is produced by the screen technique illustrated in FIGURE 1(c).

The thickness of the coatings as formed may be varied between 0.1 and 2.0 mils. Upon drying and firing, the thickness is reduced by shrinkage by an amount which depends upon the particular metallizing formulation. The metallizing formulation of the example shrinks about 50%. Taking this as an average, the fired films will range in the thickness between 0.05 and 1 mil thick.

Following application, the coating 25 is dried. Drying may be achieved by evaporation of the solvent therein in air. This may be accelerated by applying heat and/or air circulation.

Following coating and drying where it is desired, the coated film is stripped from its support as illustrated in FIGURE 1(e). Stripping comprises picking up one corner of the film 23 and pulling the film 23 away from the support 21. In continuous processing, the support may be, for example, a continuous moving metal band from which the film is continuously stripped.

*Bonding.*—Following producing a plurality of coated and/or uncoated films, a plurality of said films are stacked in the proper registry with respect to one another and bonded into a monolithic laminate 27. The ceramic dielectric composition in the various films may be the same or may differ from layer to layer. Thus, in the laminate produced, different ceramic compositions may be used to obtain desired combinations of physical, chemical or electrical compositions. Also, the metallizing coating may be the same or may differ in composition or in configuration from film to film. Also the film may be continuous or may have cut out portions which, in the final product, appear as holes or recesses. Thus, by the lamination processes of the invention, one may produce ceramic structures that are now made by machining operations. Some such structures are ceramic containers having electrical connections and shields extending therein or therethrough. In any case, depending on the particular design a plurality of films are stacked upon one another in the desired registry.

Next, heat and pressure are applied to the stack to bond the films together. This step is critical. Mere consolidation has proved inadequate and results in various of the films parting from one another during the sintering step. It is necessary for the binders in the various films and coatings to interact and to form a bond which will endure uniformly in the laminate through the step of volatilizing the binders. It should also be noted that the bond between films should be compatible with the bond within each film, since delamination by longitudinal rupture within a film is also a possibility. It has been found, however, that by maintaining the film and coating thicknesses within the above-described ranges and by providing adequate bonding by heat and pressure, useful units are produced with a low reject rate.

The temperature and pressure used for bonding will vary according to the binders used and according to the number and thicknesses of films to be bonded. Useful ranges have been found to be about 95° to 150° C. and about 750 and 1500 pounds per square inch pressure. The optimum time required for bonding depends on the foregoing factors and is easily determined empirically.

When heat and pressure are applied during the consolidation step, there is a tendency for the films to stick to the hot platen 51. To overcome this problem, a thin separating layer is placed between each platen and the stack. Ordinary wax paper lends itself to the job satisfactorily. In a preferred arrangement, a piece of wax paper and a piece of bond paper is placed between the platen and the stack. Mylar sheet has been used as a separating layer to obtain a smoother surface on the laminate after pressing.

Following bonding, individual units may be cut, punched or stamped from the laminate. This is convenient because the laminate is soft compared with the sintered product. Nevertheless, cutting may be carried out after sintering if desired.

*Sintering and termination.*—The laminate is now ready for sintering. This is achieved in the usual manner for ceramic articles by placing the laminate on a refractory setter and heating for the desired time and at the desired temperatures. The choice of setter, sintering time and sintering temperature depends on the particular ceramic composition and the particular article being sintered.

It is important to appreciate that there are two objects to the heat step: to volatilize the binders, and to sinter the particles without disrupting them either physically or chemically. To this end the laminate is first heated at a lower temperature, preferably between 200° and 500° C. in air until the binders are volatilized. Then, the temperature is raised to a higher temperature, preferably between 1000° and 1500° C. until the particles are sintered. The sintered laminate is cooled and removed from the furnace.

The sintered article may be cut into units as with a diamond saw or by ultrasonic drilling. Also, terminations may be applied by coating a part of the surface with a metal paste and then drying the paste.

*Example 2.*—A unit comprising 8 layers (6 as capacitor dielectric) of ceramic composition B, (above) and 7 palladium electrodes each 0.2 by 0.2 inch square and prepared by method of the invention has a capacitance of about 200 micromicrofarads and a breakdown voltage of about 200 volts.

The table tabulates some electrical properties of capacitors made with various ceramic dielectric composition and numbers of layers. All ceramic layers are about 0.002 inch thick each. The electrodes are of palladium 0.2 x 0.2 inch square. The number of layers indicates the number of layers as capacitor dielectric. Each unit has also two additional outer dielectric layers.

*Table*

| Composition | Number of layers | Capacitance, mmf. | Breakdown voltage |
|---|---|---|---|
| E | 1 | 21,000 | 200-300 |
| E | 2 | 42,000 | 200-300 |
| E | 3 | 63,000 | 200-300 |
| E | 4 | 84,000 | 200-300 |
| E | 5 | 100,000 | 200-300 |
| A | 1 | 225 | 200-300 |
| A | 5 | 1,125 | 200-300 |
| D | 1 | 6,000 | 200-300 |
| D | 5 | 30,000 | 200-300 |

What is claimed is:

1. A method for manufacturing a multilayer monolithic ceramic body which includes producing a plurality of individual dry thin films, each film comprising a mixture of finely divided solid substances which upon heating react to produce ceramic particles, and a heat volatile binder therefor, depositing a thin coating comprising finely divided metal particles and a heat volatile binder therefor upon a predetermined portion of the surface less than the entire surface of at least two of said films, stacking said plurality of said films upon one another with said coated portions of said films in registry with one above another, bonding said stacked films and said coatings into a laminate by the action of heat and pressure, and then heating said laminate at a temperature sufficient to react said substances into ceramic particles and to sinter said ceramic particles and said metal particles into a monolithic ceramic body.

2. A method for manufacturing a multilayer monolithic ceramic body including producing a plurality of individual dry thin films each film comprising a mixture of finely divided solid substances which upon heating react to produce ceramic dielectric particles, and a heat-volatile binder therefor, depositing a thin coating comprising finely divided metal particles and a heat volatile binder therefor upon predetermined major surface portions less than the entire surface of at least two of said films, stacking said plurality of said films upon one another with said coated portions of said films in registry with one above another, compressing and heating said stack of films whereby to bond said films and said coatings into a laminate by the action of heat and pressure, and then heating said laminate at temperatures and for a time sufficient to volatilize said binders and to react said substances into dielectric particles and sinter said ceramic particles and said metal particles into a monolithic ceramic body.

3. A method for manufacturing a monolithic multilayer ceramic body including producing a plurality of individual dry thin films each comprising a mixture of finely divided solid substances which upon heating react to produce ceramic dielectric particles, and a heat volatile binder therefor, depositing a thin coating comprising finely divided metal particles and a heat volatile binder therefor upon predetermined portions of a major surface less than the entire surface of each of said films, stacking said plurality of said films upon one another with said coated portions of said films in registry above one another, bonding said films and said coatings into a laminate, removing from said laminate portions thereof having a desired configuration and including said predetermined portions of said coatings, and then heating the removed portions of said laminate in air first at lower temperatures for a time sufficient to volatilize said binders and then at higher temperatures for a time sufficient to react said substances into ceramic particles and to sinter said ceramic and said metal particles into a monolithic ceramic body.

4. A method for manufacturing monolithic multilayer ceramic capacitors which includes producing by doctor blading a plurality of discontinuous films, each said film comprising unfired ceramic dielectric particles of the titanate group in a heat-volatile thermoplastic binder therefor, drying said films, cutting out predetermined portions of said films, screening a thin coating comprising finely divided metal particles in a heat volatile binder therefor upon predetermined portions of a major surface of each of said films, drying said coatings, stacking said plurality of said films upon one another with said coated portions of said films in registry above one another, applying 750 to 1500 pounds per square inch pressure and temperatures of about 95 to 150° C. to said stack to bond said films into a laminate, heating said laminate in air first at temperatures between 200 and 500° C. until said binders are substantially entirely volatilized and then at temperatures between 1000 to 1500° C. until said ceramic particles and said metal particles are sintered into a monolithic body having recesses therein, and then removing from said monolithic body some portions thereof having a desired configuration.

5. A method for manufacturing a monolithic multilayer ceramic capacitor including casting a plurality of individual dry thin films each comprising unfired ceramic dielectric particles of the titanate group in a heat-volatile thermoplastic binder therefor, depositing a thin coating comprising finely divided metal particles in a heat-volatile binder therefor upon predetermined portions of a major surface less than the entire surface of all but one of said films, stacking said plurality of said films upon one another with said coated portions of said films in registry above one another and with said one film on top of said stack, applying about 750 to 1500 pounds per square inch pressure and temperatures of about 95 to 150° C. to said stack to bond said films and coatings into a laminate, heating said laminate at temperatures between 1000° and 1500° C. for between 1 to 10 hours in air to form a monolithic ceramic body, and then removing from said monolithic body, portions thereof having a desired configuration and including said predetermined portions of said coatings.

6. The method of claim 5 wherein said thin coating consists essentially of flux-free palladium paste.

7. The method of claim 5 wherein said thin coating consists essentially of flux-free platinum paste.

8. The method of claim 5 wherein said ceramic dielectric particles consists essentially of barium titanate and said binder consists essentially of a vinyl resin.

References Cited by the Examiner

UNITED STATES PATENTS

| 2,736,080 | 2/56 | Walker et al. | 106—46 |
| 2,750,657 | 6/56 | Herbert et al. | |
| 2,776,898 | 1/57 | Day et al. | 106—46 |
| 3,004,197 | 10/61 | Rodriquez et al. | 156—89 |
| 3,028,656 | 4/62 | Herbert | 75—208 |

FOREIGN PATENTS 574,577   1/46   Great Britain.

EARL M. BERGERT, *Primary Examiner.*

CARL F. KRAFFT, *Examiner.*